(12) United States Patent
Ling

(10) Patent No.: US 6,183,905 B1
(45) Date of Patent: Feb. 6, 2001

(54) TERMINAL SEAL FOR ELECTROLYTIC DEVICES

(76) Inventor: Peter Ling, 106 Wintermute Blvd., Toronto, Ontario (CA), M1W 3N8

( * ) Notice: Under 35 U.S.C. 154(b), the term of this patent shall be extended for 0 days.

(21) Appl. No.: 09/250,367

(22) Filed: Feb. 12, 1999

(30) Foreign Application Priority Data

Dec. 23, 1998 (CA) .................................................. 2256987

(51) Int. Cl.⁷ .................................................. H01M 2/06
(52) U.S. Cl. ........................ 429/181; 429/178; 429/180
(58) Field of Search .................................... 429/178, 180, 429/181

(56) References Cited

U.S. PATENT DOCUMENTS

| | | | |
|---|---|---|---|
| 4,317,870 | * 3/1982 | Oellerich | 429/161 |
| 5,472,802 | * 12/1995 | Holland et al. | 429/54 |
| 5,663,015 | 9/1997 | Hooke et al. | 429/181 |

FOREIGN PATENT DOCUMENTS

| | | |
|---|---|---|
| 298379 | of 1929 | (CA) . |
| 1067958 | 12/1979 | (CA) . |

* cited by examiner

*Primary Examiner*—Carol Chaney
(74) *Attorney, Agent, or Firm*—Leonard Bloom

(57) ABSTRACT

A terminal assembly for sealing and electrically isolating a conducting terminal from a container of an electrolytic device uses a lock nut and a single-piece deformable gasket. When the lock nut is threaded down the terminal, an inwardly tapered sleeve of the lock nut cooperates with an outwardly tapered zone of the gasket to force the gasket to surround the opening of the container and to seal the terminal before compression is applied. Reliable sealing and electrical insulation are provided because predetermined axial and radial compression forces are generated on the opening of the container. A robust sealed terminal is provided while over compression of the single-piece gasket is prevented.

18 Claims, 3 Drawing Sheets

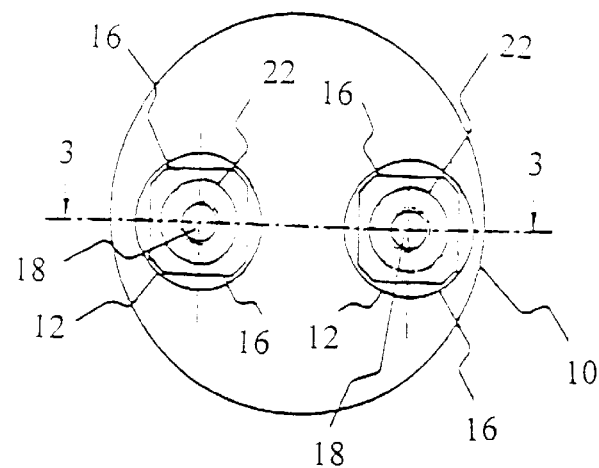
Fig 2
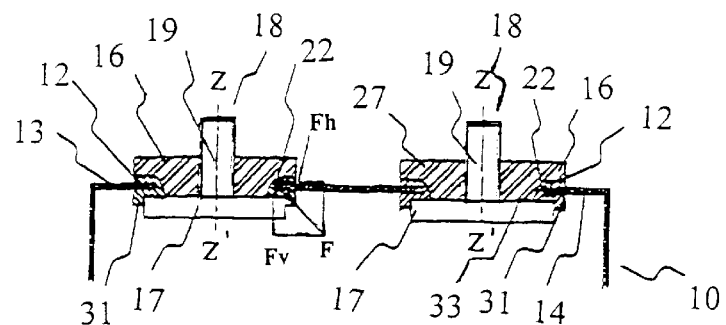
Fig 3
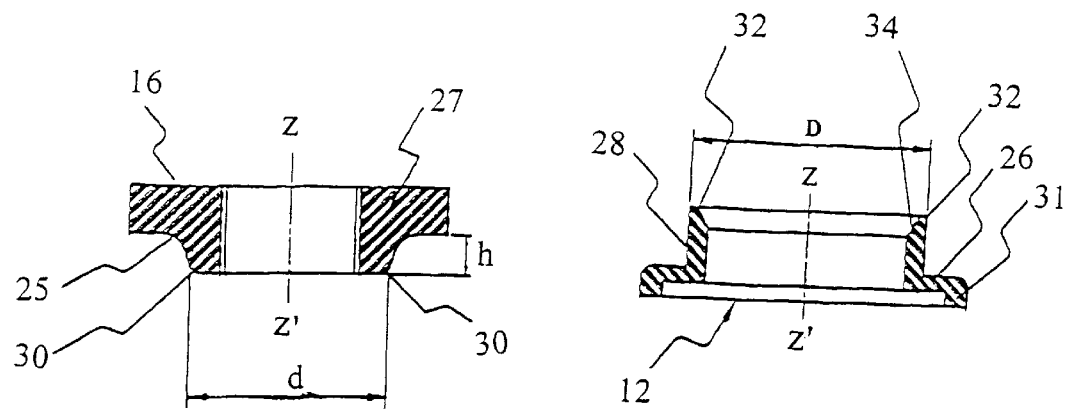
Fig 4a
Fig 4b

TERMINAL SEAL FOR ELECTROLYTIC DEVICES

BACKGROUND OF THE INVENTION

1. Field of Invention

The present invention relates to conducting terminals attached to the container of an electrolytic device, and in particular to a battery terminal seal.

2. Description of the Related Art

It is well-known in the art of manufacturing electrochemical cells that one of the critical issues is the construction and maintenance of a hermetic seal between the conducting terminals and the cover of the container. A related problem is to electrically insulate terminals of opposite polarity, in order to prevent short-circuits which would impede proper functioning of the electrolytic process in the cell. In the case of a container having a metallic supporting surface, at least one of the polarity terminals must be hermetically sealed and electrically insulated from the container, and the container itself may be used as the second polarity terminal.

U.S. Pat. No. 5,663,015 to Hooke et al. and assigned to "Hawker Energy Products, Inc.", discloses a method of making a battery terminal seal. A moulded plastic nut having an internal thread to mate the external thread of the battery terminal fastens the terminal trough an orifice in the lid of the battery. The gap between the top surface of the terminal and the orifice provided in the lid is filled with a curable gasketing material. While the gasketing material is still uncured, the nut is rotated to compress the gasketing material so as to fill any gap between the terminal and the lid. However, the solution disclosed in the Hooke et al. patent is rather labourious because the radial and axial spread of the gasketing material while in an uncured state has to be restricted to the combination of the terminal, the fastener, and the top surface of the terminal. In addition, two sealing parts, i.e. the gasket and an O-ring, need to be compressed against the inner lid to prevent the spread of the electrolyte. The uncured gasketing material provides no compression force. After the material is cured, leakage prevention depends on the bonding properties of the material.

Canadian Patent No. 1,067,958 to Ching et al. assigned to "The Gates Rubber Company", discloses a sealed through-the-partition connector comprising a terminal with an enlarged and tapered bottom portion for mating with a deformable lead shroud, and for cooperating with an inverted frustroconical ramp portion defined in the connector seat. The seat should have some degree of resiliency to bias the deformable lead shroud in a mutually pressure exerting relation. If the connector seat lacks sufficient resiliency, it may creep under constant loading and to break the seal. While Ching et al. is concerned with sealing a battery terminal, it is not concerned with electrical isolation between the container and the conductive terminals.

Canadian Patent No. 298,379 to Swenson, discloses a lead nut with a tapered wall which is threaded upon a battery terminal to cause compression around the terminal. A central opening is defined in the cavity of a boss formed in the top wall of the container for receiving the external portion of the battery terminal. Two sealing parts, a rubber gasket and a rubber washer, are used for sealing the central opening when the nut is threaded downwardly on the terminal. This construction does not allow to use a metallic container, because the conductive terminals are not electrically isolated.

Accordingly, there is a need for a simple conductive terminal which can be used with both conductive and nonconductive supporting containers, while providing a good sealing for preventing electrolyte leakage.

SUMMARY OF THE INVENTION

An object of the invention is to provide a simple and inexpensive battery terminal seal for reliably attaching conducting terminals to the supporting lid of a storage battery, which alleviates totally or in part the drawbacks of the prior art constructions.

Another object of this invention is to provide a battery terminal seal using a single-piece gasket to seal and to electrically isolate the conducting terminals.

Still a further object of the present invention is to provide an inexpensive while robust sealed battery terminal.

In one embodiment of the present invention, a terminal assembly for a container of an electrolytic device is provided. A container lid includes a boss with a central opening. An insulation gasket has a base with a central orifice surrounded by a cylindrical neck extending at a right angle from one side of the base and a rim extends at a right angle from the opposite side of the base. The cylindrical neck has an internally defined outwardly tapered zone which ends with a circular margin. The diameter of the circular margin is sized to snap fit in the opening of the boss. A connector has a seating section larger than the opening in the lid, a threaded section perpendicularly extending from one face of the seating section and a head extending from the opposite face of the seating section. The threaded section is designed to be received into the cylindrical neck of the gasket. A lock nut includes a flange and a tapered sleeve extending at a right angle from said flange. The tapered sleeve has a threaded central bore with a leading edge. The leading edge of the tapered sleeve has an outside diameter smaller than the inside diameter of the circular margin of the gasket. The threaded bore of the lock nut is adapted to receive the threaded section of the connector for advancing the tapered sleeve inside the cylindrical neck of the gasket for generating radial and axial compression forces on the cylindrical neck. The cylindrical neck is deformed and wrapped around the opening of the boss, such that it becomes interposed between the tapered sleeve of the lock nut and the seating section of the connector. A tight seal between said lid said connector and said lock nut is provided, while the connector is secured to the container.

In another embodiment of the invention, a method of mounting a terminal on a container of an electrolytic device is provided. A connector, a deformable insulating gasket and a lock nut are provided. The connector has a seat and a threaded post extending from said seat. The lock nut includes a flange and a tapered sleeve having a threaded central bore adapted to receive the threaded post of the connector. The insulating gasket has a base with a central orifice surrounded by a cylindrical neck extending from one side of the base. The gasket is inserted in an opening provided in a lid of the container such that the cylindrical neck protrudes through the opening of the lid and snaps fit. The connector is then inserted through the central orifice of the gasket such that said threaded post is received inside the cylindrical neck and protrudes through said opening of said lid. As the lock nut is threaded onto the post of the connector the tapered sleeve of the lock nut advances inside the cylindrical neck of the gasket for generating radial and axial compression forces on the cylindrical neck. The cylindrical neck is deformed and forced to wrap around the opening in the lid and to become interposed between the tapered sleeve of the lock nut and the seat of the connector. A tight seal between the lid, the connector and the lock nut is provided.

The battery terminal seal according to the invention is simple, yet it provides reliable insulation and sealing, because it generates both axial and radial compression forces on the container lid. No precision tooling or machinery is required. The assembly of the terminals may be performed manually.

Another advantage of the present invention is the versatility of the battery terminal which can be used with both conductive and non-conductive supporting surface battery containers. In addition, the terminals provide a very good sealing against leakage and this makes them suitable for use with an electrolytic device.

BRIEF DESCRIPTION OF THE DRAWINGS

The above and other features of the invention, including various novel details of the construction and the combination of parts, will now be more particularly described with reference to the accompanying drawings where:

FIG. 2 is a top view of the supporting lid of an electrolytic device using a gasket according to one embodiment of the invention;

FIG. 3 is a sectional view of the supporting lid of FIG. 2 along line 3—3;

FIG. 4a is a cross sectional view of the locking nut used by the invention;

FIG. 4b is a cross sectional view of the insulating gasket used by the invention;

DETAILED DESCRIPTION OF THE PREFERRED EMBODIMENT

Figure 1A:
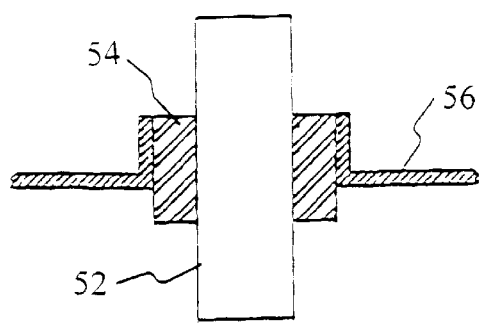
FIGS. 1A, 1B, 1C, 1D show conventional constructions for connectors used with electrolytic devices.

FIGS. 1A to 1D show conventional ways of mounting the terminals of a battery. FIG. 1A shows a conducting terminal 52 which is isolated from a metallic container wall 56 through a layer of non-conductive adhesive material 54. Layer 54 is applied by ceramic fusion, glass fusion or epoxy bonding. Since in such a configuration there is no permanent compression between the nonconductive material and the terminal, leakage prevention relies upon material bonding properties. Furthermore, the process of inserting the non-conductive material is very expensive. It is also difficult to uniformly apply the nonconductive material around the terminal without the formation of air bubbles which compromises the adhesion and the hermetic seal.

Figure 1B:
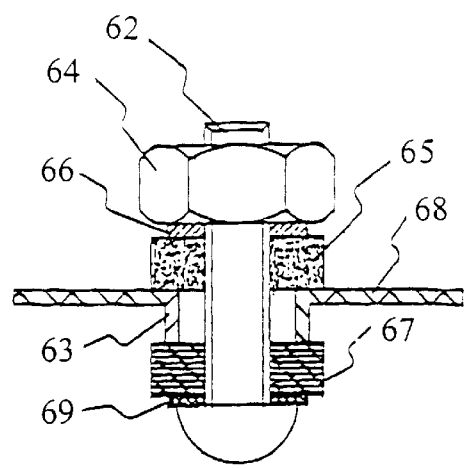

Another conventional technique shown in FIG. 1B, uses a rubber O-ring 63 at the junction of a conducting terminal 62 and a metallic container wall 68. A compressive force generated when lock nut 64 is assembled on terminal 62, is applied to insulation retainers 65 and 67 and washers 66 and 69 for compressing an O-ring 63 to seal the electrolyte inside the battery container.

Figure 1C:
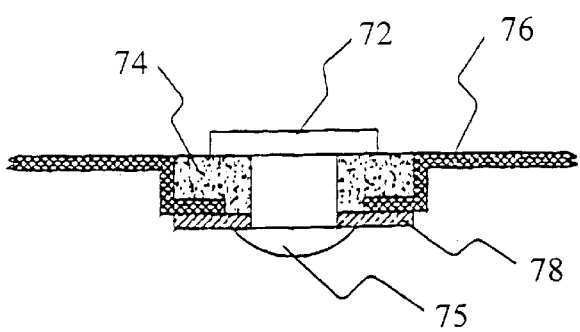

FIG. 1C illustrates a battery terminal 72 attached to a metallic lid 76 of a container by a rivet head 75. In this embodiment, an insulating washer 78 and an insulating retainer 74, seal and electrically insulate the terminal 72 from the lid 76.

A problem with the two above mentioned techniques is that compressive forces are generated only in one direction, namely vertical or horizontal, with respect to the axis of the terminal. If the compression force is not controlled, the resulting construction is unstable, more prone to cracking, breakage and possible leakage, or the attachment of the terminal to the supporting lid may be loose, resulting in electrolyte leakage.

Figure 1D:
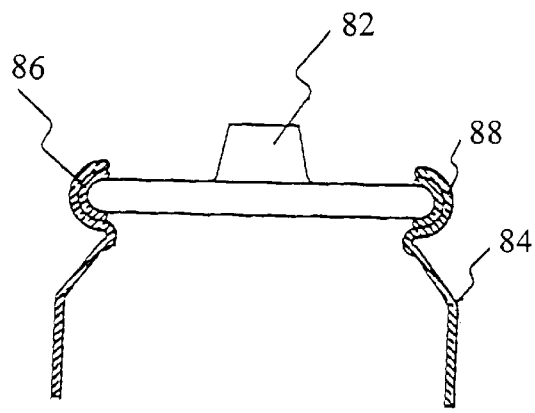

FIG. 1D shows another conventional method for attaching a conducting terminal 82 to a metallic container 84. An insulation gasket 86 is placed around terminal 82 for sealing and electrically isolating the terminal 82 from the container 84. The compression force generated when bending the outside metal wall 88 of the container 84, compresses the rubber gasket 86 against the conducting terminal 82 to seal the electrolyte inside the container 84. However, control of the crimping operation is critical. Over-compression may cause damages to the gasket, while insufficient compression may lead to electrolyte leakage. The compression ratio depends on the precision of the assembling machinery and on the crimping die/rollers design, requiring a complicated manufacturing process.

Figure 6:
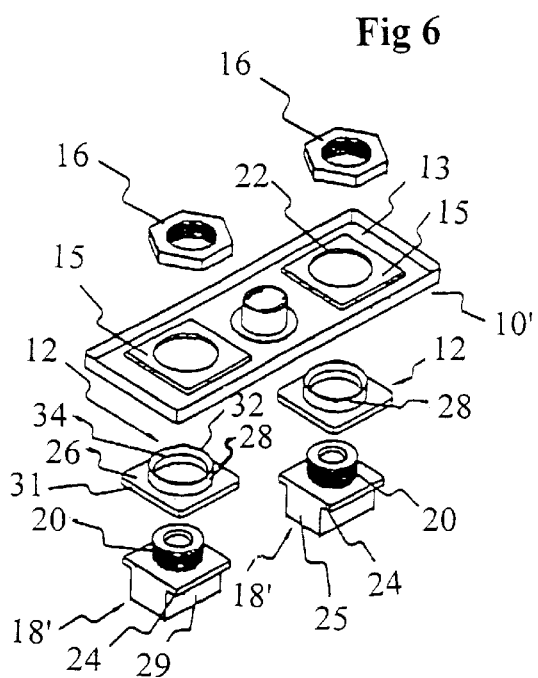
FIG. 6 is an exploded view of the lid of FIG. 5 showing the terminal mounting parts as seen with respect to the face of the lid.
Figure 7:
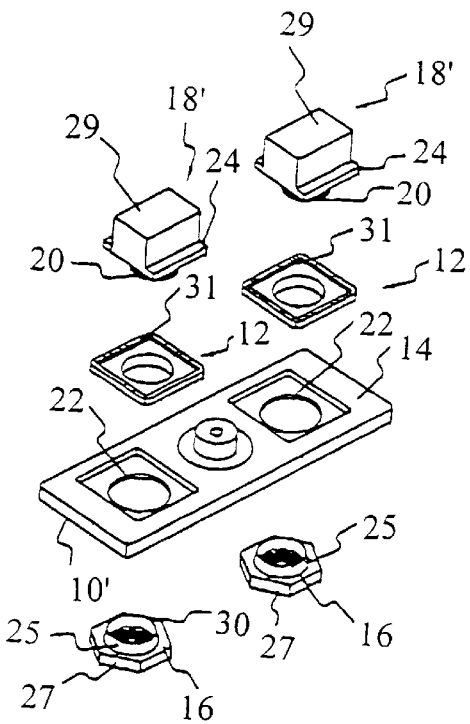
FIG. 7 is an exploded view of the lid of FIG. 5 showing the terminal mounting parts as seen with respect to the back face of the lid.

FIG. 2 is a top view of a storage battery having conducting terminals mounted according to one embodiment of the invention. The battery has a supporting lid 10 provided with openings 22 for receiving connectors 18 and an insulating 12 arranged between lock nut 16 and lid 10. Each connector 18 is attached to lid 10 with a lock nut 16. The gasket 12 used in this embodiment is identical to the gasket 12 used in the embodiment of the invention which is illustrated in FIGS. 4, 6 and 7, and it is further described with reference to these drawings.

FIG. 3 is a sectional view of the lid 10 of FIG. 2 along line 3—3 of FIG. 2. Lid 10 has an outer face 13 and an inner face 14 defined with respect to the container. Connector 18 comprises a post 19 and a seat 17. Seat 17 is larger than the opening 22 has a cooperating face 33. Seat 22 abuts on the inner face 14 of lid 10 when the connector 18 is mounted to the lid 10. Post 19 has an external axial thread.

As better seen in FIG. 4a, lock nut 16 has a flange 27 and a tapered sleeve 25 extending perpendicularly from flange 27. The inside of sleeve 25 defines a cylindrical wall which is axially threaded. The internal thread of the sleeve 25 is sized to matingly receive the external threading of the post 19. The longitudinal axis of the post 19 is aligned with the longitudinal axis of the lock nut 16 whenever lock nut 16 is torqued down threaded post 19 of the connector 18.

The outside wall of sleeve 25 is inwardly tapered towards a leading edge 30. As also shown in FIG. 4a, sleeve 25 of lock nut 16 has a height "h".

Throughout the description, the expressions "inwardly" and "outwardly" are used with regard to the longitudinal axis of the respective item.

Gasket 12 illustrated in further detail in FIG. 4b, has a base 26 with a central orifice and a cylindrical neck 28 extending perpendicularly from base 26 around orifice 22. The cylindrical neck 28 is designed to snap fit in opening 22 of lid 10. The central orifice of gasket 12 is sized to snugly receive the threaded portion 19 of connector 18.

As better shown in FIG. 4b, the inside wall of the cylindrical neck 28 ends with an outwardly tapered zone 34 in a region away from base 26. The outwardly tapered zone 34 ends with a circular margin 32. The diameter of the circular margin 32 is noted with "D". Diameter "D" is slightly larger than diameter "d" of the leading edge 30 of the tapered sleeve 25. Gasket 12 also has a rim 31 extending at a right angle from base 26 in a direction opposite to the cylindrical neck 28. Rim 31 is sized to tightly engage seat 17 so that connector 18 can not rotate.

Reference is now made back to FIG. 3, showing how a terminal assembly according to the present invention is mounted on a lid 10 of an electrolytic device. Gasket 12 is placed on lid 10 with the cylindrical neck 28 protruding through the opening 22, and base 26 adjacent to the inner face 14 of lid 10. Next, the threaded portion 19 of connector 18 is inserted inside the cylindrical neck 28 of gasket 12, while face 33 of head 17 tightly engages rim 31 of gasket 12. Finally, each connector 18 is attached to lid 10 by threading lock nut 16 on threaded post 19 of connector 18.

As lock nut 16 advances on threaded post 19 of the connector 18, the leading edge 30 of sleeve 25 contacts first circular margin 32 of the outwardly tapered zone 34 of gasket . Thereafter, lock nut 16 is guided along the central orifice of the cylindrical neck 28 of the gasket 12 and the inwardly tapered sleeve 25 starts compressing the cylindrical neck 28 of the deformable gasket 12. Gradually, neck 28 is deformed and bent over the outer face 13 of lid 10 by the tapered sleeve 25, and forced to uniformly wrap around opening 22. Finally, the cylindrical neck 28 of gasket 12 is compressed by flange 27 of lock nut 16 against face 13 of lid 10, so that gasket 12 becomes interposed between the tapered sleeve 25 of the lock nut 16 and seat 17 of the conductor 18, while base 26 of the gasket 12 is squeezed against both the inner surface 14 of lid 10 and around opening 22.

When the leading edge 30 of the lock nut 16 contacts seat 17, lock nut 16 is fully seated on terminal 18 and therefore can not be further rotated and the single-piece deformable gasket 12 covers all the free space left between lock nut 16 and lid 10.

Height "h", as well as the inclination of the tapered wall of sleeve 25 are designed so as to stop the rotation of lock nut 16 about connector 18 when a predetermined compression force (F) is generated between lock nut 16 and lid 10. Height "h" and the inclination of the tapered wall of sleeve 25 dictate how far lock nut 16 can advance along the threaded portion 19 of the connector 18 until it is completely threaded, as well as the thickness of the gasket 12 in the deformed state. As a consequence, over-compression of the gasket 12 in the vertical direction is prevented. Simultaneously, adequate radial compression of the portion of the gasket 12 contacting opening 22, is provided.

A material having a suitable resiliency and insulating properties for manufacturing gasket 12 is a thermoplastic injection molding with sufficient elongation and elastic properties, as for example nylon, polysulfone, etc.

As shown in FIG. 3, the compression force (F) generated between sleeve 25 and opening 22 has a axial component (Fv) and a radial component (Fh). The axial compression force (Fv) acts between flange 27 of lock nut 16 and the face 33 of the seat 17 for compressing gasket 12 against both inner and outer faces 13 and 14 of lid 10 in a direction parallel to the longitudinal axis Z–Z'. The radial compression force (Fh) compresses gasket 12 against the wall of the opening 22.

After connector 18 is mounted on lid 10 for the first time, gasket 12 will remain attached to lid 10 such that connector 18 can be easily replaced when needed, without replacing the gasket 12. For preventing corrosion, an anticorrosion coating, for example a tar pitch, may be applied on lid 10 and on gasket 12 before mounting the gasket 12.

Figure 5:
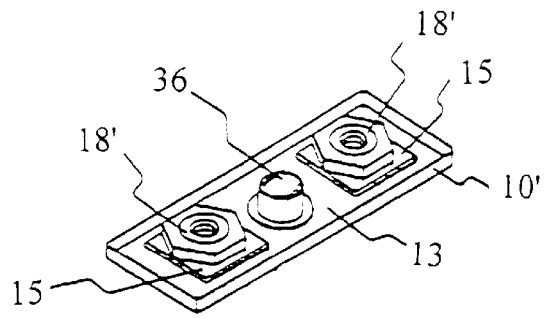
FIG. 5 is an perspective view of the supporting lid according to another embodiment of the invention.

FIG. 5 illustrates a lid 10' of another embodiment having bosses 15 and a central vent 36. Vent 36 releases excessive gas pressure which may develop during chemical reactions inside the battery cells. Boss 15 provided on the outer face 13 of lid 10' has a rectangular shape. A circular opening 22 is centrally provided on boss 15.

Terminal 18' has in this embodiment three sections: an externally threaded section 20, a head 29, and a seating section 24, as shown in FIG. 6. The head 29 of connector 18' is used to establish electrical connection with the electric circuit inside the battery and it may have any shape and size suitable for this purpose. An internally threaded bore is also provided on the threaded section 20 for connecting an external load to the battery.

Figure 8:
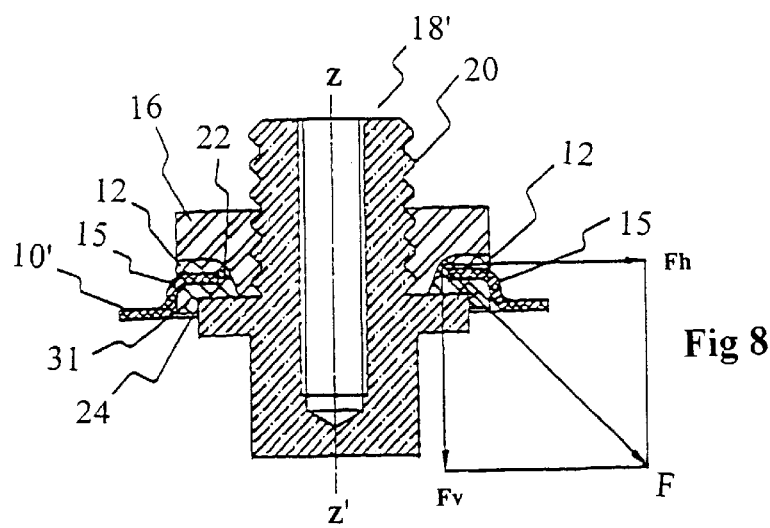
FIG. 8 is a cross sectional view of a connector mounted on the supporting lid of FIG. 5.

FIG. 8 is a sectional view of the battery connector 18' of FIGS. 5, 6 and 7, mounted on lid 10'. The boss 15, the base 26 of gasket 12, and the seating section 24 of connector 18', have same geometrical shape and preselected dimensions for attaching the battery terminal to the container lid 10.

The seating section 24 is larger than opening 22 and has the same shape as rim 31 of the gasket 12. The perimeter of the seating section 24 is designed to be tightly received inside rim 31. Thus, when the connector 18' is mounted on lid 10', gasket 12 is snapped fit in opening 22 provided in boss 15 and seating section 24 of connector 18' is surrounded by rim 31 of gasket 12, such that connector 18' can no longer rotate inside opening 22. The arrangement of the parts inside boss 15 provides for a tight clamping and prevents any displacement of connector 18' which might otherwise be caused by threading lock nut 16 onto connector 18'.

In the embodiment illustrated in FIGS. 5–8, the shape of the boss 15 is rectangular, but it is to be understood that any easily manufacturable shape would be suitable. Lock nut 16 and gasket 12 are similar to those described in connection with the embodiment of FIGS. 2, 3 and 4.

To assembly the terminal, same steps are performed as described in connection with the embodiment of FIGS. 2, 3 and 4. The diameter "d" of the leading edge 30 and the height "h" of the sleeve 25 are selected to cause a predetermined compression force on the insulating gasket 12 whenever nut 16 contacts seating section 24 of connector 18 and stops advancing along the threaded section 20, as discussed above in connection with the first embodiment of the invention.

The invention uses a lock nut with a tapered sleeve to force the singlepiece gasket to surround the opening of a container and to seal a connector, before compression is applied. The use of a one-piece gasket provides for a simple construction compared to the prior art methods which use multiple gaskets or multiple insulation parts. The design of the nut 16 in cooperation with gasket 12 and connector 18', allows to overcome the negative results of an excessive or insufficient compression force applied. No precision tooling is required.

While electrochemical cells, storage batteries and other electrolytic devices are a direct application, the sealed conductive terminal according to the invention can be used in any other electrical device requiring the above mentioned performances.

It will be understood that the particular terminal seal embodying the invention is shown by way of illustration only and not as a limitation of the invention. The principles and features of this invention may be employed in various and numerous embodiments without departing from the scope of the invention.

What is claimed is:

1. A terminal assembly for a container of an electrolytic device, comprising:
an insulation gasket having a base with a central orifice surrounded by a cylindrical neck extending from one side of said base and having an external diameter sized to fit in an opening provided in a lid of said container;
a connector having a seat and a threaded post positioned on said seat for insertion through said cylindrical neck of said gasket; and
a lock nut with a tapered sleeve having a threaded central bore adapted to receive said threaded post of said connector, for advancing said tapered sleeve inside said cylindrical neck of said gasket for generating radial and axial forces on said neck to deform said neck and cause it to wrap around said opening in said lid of the container and to become interposed between said tapered sleeve of said lock nut and said seat of said connector, to provide a seal between said lid, said connector and said lock nut.

2. The terminal assembly of claim 1, wherein said gasket further comprises a rim which extends around the perimeter of said base of said gasket for surrounding said seat of said connector and attaching said connector to said gasket.

3. The terminal assembly of claim 1, wherein said cylindrical neck has an outwardly tapered internally defined zone ending with a circular margin for receiving a circular leading edge on said tapered sleeve, said leading edge having a diameter slightly smaller than the diameter of said circular margin so as to be receivable therein when said lock nut is tightened.

4. The terminal assembly of claim 1, wherein said external diameter of said cylindrical neck is sized to snap fit in said opening.

5. The terminal assembly of claim 1, wherein said cylindrical neck extending at a right angle around said central orifice, said rim extending at a right angle from said base, said post perpendicularly extending from said seat, and said bore extending at a right angle from said flange.

6. The terminal assembly of claim 3, wherein the height and the inclination of said tapered sleeve are so selected to obtain predetermined values for said radial and said axial forces whenever said leading edge of said lock nut is fully seated on said seat of said container.

7. The terminal assembly of claim 1, wherein said gasket is made of engineering plastic with sufficient elongation and elastic properties.

8. A terminal assembly for a container of an electrolytic device, comprising:
a container lid with a boss defined in said lid, said boss having a central opening;
an insulation gasket having a base and a cylindrical neck extending from one side of said base and a central orifice extending axially of said neck and having an external diameter sized to fit in said opening of said boss;
a connector having a seating section and a threaded section extending from one face of said seating section for insertion into said neck;
a lock nut including a flange and a tapered sleeve having a threaded central bore adapted to receive said threaded section of said connector for advancing said tapered sleeve inside said cylindrical neck for generating radial and axial compression forces on said neck to deform said neck and cause it to wrap around said opening in said boss of said container lid, to provide a seal between said lid said connector and said lock nut, and to secure said connector to said container.

9. The terminal assembly of claim 8, wherein said gasket further comprises a rim which extends around the perimeter of said base of said gasket for surrounding said seating section of said connector and attaching said connector to said gasket.

10. The terminal assembly of claim 8, wherein said cylindrical neck has a circular margin for receiving a circular leading edge on said bore, said leading edge having a diameter slightly smaller than the diameter of said margin.

11. The terminal assembly of claim 8, wherein said external diameter of said cylindrical neck is sized to snap fit in said opening.

12. The terminal assembly of claim 8, wherein said cylindrical neck extending at a right angle around said central orifice, said rim extending at a right angle from said base, said post perpendicularly extending from said seat, said bore extending at a right angle from said flange, said boss extending in a plan parallel to said lid, and said opening centrally defined on said boss.

13. The terminal assembly of claim 10, wherein the height and the inclination of said tapered sleeve are so selected to obtain predetermined values for said radial and said axial forces whenever said leading edge of said lock nut is fully seated on said seat of said connector.

14. A terminal assembly as in claim 8, wherein said connector further comprises a head extending from a second face of said seating section opposite to said one face, for attachment to the electrolytical plates.

15. A terminal assembly for a container of an electrolytic device, comprising:
a container lid with a boss defined in said lid, said boss having a central opening;
an insulation gasket having a base with a central orifice surrounded by a cylindrical neck extending at a right angle from one side of said base and a rim extending at a right angle from the opposite side of said base, said cylindrical neck having an internally defined outwardly tapered zone, said zone ending with a circular margin having a diameter sized to snap fit in said opening of said boss;
a connector having a seating section larger than said opening in said lid, a threaded section perpendicularly extending from one face of said seating section and a head extending from the opposite face of said seating section, said threaded section for insertion into said cylindrical neck of said gasket;
a lock nut including a flange and a tapered sleeve extending at a right angle from said flange and having a threaded central bore and a leading edge with an outside diameter smaller than the inside diameter of said circular margin of said gasket, said threaded bore of said lock nut adapted to receive said threaded section of said connector for advancing said tapered sleeve inside said cylindrical neck of said gasket for generating radial and axial compression forces on said cylindrical neck to deform said neck and cause it to wrap around said opening in said boss of said container and to become interposed between said tapered sleeve of said lock nut and said seating section of said connector, to provide a seal between said lid said connector and said lock nut, and to secure said connector to said container.

16. A method of mounting a terminal on a container of an electrolytic device, comprising the steps of:
a) providing a connector and a lock nut, said connector having a seat and a threaded post extending from said seat, said lock nut including a flange and a tapered sleeve having a threaded central bore adapted to receive said threaded post of said connector;

b) providing an insulating gasket having a base with a central orifice surrounded by a cylindrical neck extending from one side of said base;

c) inserting said gasket in an opening provided in a lid of said container such that said cylindrical neck protrudes through said opening of said lid;

d) inserting said connector through said central orifice of said gasket such that said threaded post is received inside said cylindrical neck and protrudes through opening of said lid;

e) threading said lock nut onto said threaded post of said connector and allowing said tapered sleeve of said lock nut to advance inside said cylindrical neck of said gasket for generating radial and axial compression forces on said cylindrical neck to deform said neck and cause it to wrap around said opening in said lid and to become interposed between said tapered sleeve of said lock nut and said seat of said connector, to provide a seal between said lid said connector and said lock nut.

17. The method of claim 16 wherein step (e) further comprises stopping the rotation of said lock nut when said lock nut is fully seated on said seat of said connector and predetermined values for said radial and said axial compression forces are generated.

18. A terminal assembly for a container of an electrolytic device, comprising:

connector means for protruding through an orifice defined in a lid of said container;

fastening means for threadingly engaging said connector means; and deformable sealing means interposed between said connector means and said fastening means for providing a tight seal between said connector means said fastening means and said lid, whenever said fastening means is completely threaded on said connector means, and radial and axial compression forces are generated causing said sealing means to wrap around said opening in said lid.

* * * * *